United States Patent
Rao et al.

(10) Patent No.: US 11,463,778 B2
(45) Date of Patent: *Oct. 4, 2022

(54) MEDIA CONTENT SEARCH RESULTS RANKED BY POPULARITY

(71) Applicant: Rovi Technologies Corporation, San Jose, CA (US)

(72) Inventors: Pradhan S. Rao, Sunnyvale, CA (US); David H. Sloo, Menlo Park, CA (US)

(73) Assignee: Rovi Technologies Corporation, San Jose, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 16/839,736

(22) Filed: Apr. 3, 2020

(65) Prior Publication Data

US 2020/0351565 A1 Nov. 5, 2020

Related U.S. Application Data

(63) Continuation of application No. 16/509,195, filed on Jul. 11, 2019, now Pat. No. 10,694,256, which is a
(Continued)

(51) Int. Cl.
| | | |
|---|---|---|
| *G06F 16/00* | (2019.01) | |
| *H04N 21/482* | (2011.01) | |
| *G06F 16/338* | (2019.01) | |
| *G06F 16/9535* | (2019.01) | |
| *H04H 60/46* | (2008.01) | |

(Continued)

(52) U.S. Cl.
CPC ....... *H04N 21/4828* (2013.01); *G06F 16/338* (2019.01); *G06F 16/9535* (2019.01); *H04H 60/46* (2013.01); *H04N 7/17318* (2013.01); *H04N 21/252* (2013.01); *H04N 21/44204* (2013.01); *H04N 21/4532* (2013.01); *H04N 21/4661* (2013.01); *H04N 21/47* (2013.01); *H04N 21/4756* (2013.01)

(58) Field of Classification Search
None
See application file for complete search history.

(56) References Cited

U.S. PATENT DOCUMENTS

| | | |
|---|---|---|
| 6,006,218 A | 12/1999 | Breese |
| 6,321,221 B1 | 11/2001 | Bieganski |

(Continued)

FOREIGN PATENT DOCUMENTS

WO 2006079977 8/2006

OTHER PUBLICATIONS

Gutta S et al.: "TV Content Recommender System", Proceedings National Conference on Artificial Intellige, XX, XX, Jul. 30, 2000 (Jul. 30, 2000), XP008003365.

(Continued)

*Primary Examiner* — Debbie M Le
(74) *Attorney, Agent, or Firm* — Haley Guiliano LLP

(57) ABSTRACT

Media content search results ranked by popularity is described. In embodiment(s), a search request for television media content can be initiated by a viewer, and television media content that is relevant to the search request can be identified. The relevant television media content can then be ranked based on a popularity rating and the relevant television media content can be displayed in an ordered list that is ordered by popularity rankings.

20 Claims, 7 Drawing Sheets

Related U.S. Application Data continuation of application No. 15/923,429, filed on Mar. 16, 2018, now Pat. No. 10,652,621, which is a continuation of application No. 15/377,129, filed on Dec. 13, 2016, now Pat. No. 9,948,991, which is a continuation of application No. 15/174,655, filed on Jun. 6, 2016, now Pat. No. 9,554,193, which is a continuation of application No. 15/064,111, filed on Mar. 8, 2016, now abandoned, which is a continuation of application No. 13/915,411, filed on Jun. 11, 2013, now Pat. No. 9,326,025, which is a continuation of application No. 12/846,442, filed on Jul. 29, 2010, now Pat. No. 8,478,750, which is a continuation of application No. 11/716,236, filed on Mar. 9, 2007, now Pat. No. 7,801,888.

(51) Int. Cl.
| | |
|---|---|
| *H04N 7/173* | (2011.01) |
| *H04N 21/25* | (2011.01) |
| *H04N 21/466* | (2011.01) |
| *H04N 21/47* | (2011.01) |
| *H04N 21/442* | (2011.01) |
| *H04N 21/45* | (2011.01) |
| *H04N 21/475* | (2011.01) |

(56) References Cited

U.S. PATENT DOCUMENTS

| | | | |
|---|---|---|---|
| 6,334,127 | B1 | 12/2001 | Bieganski et al. |
| 7,007,294 | B1 | 2/2006 | Kurapati |
| 7,467,398 | B2 | 12/2008 | Fellenstein |
| 7,840,577 | B2 | 11/2010 | Ortega |
| 8,037,051 | B2 * | 10/2011 | Franks .................. G06F 16/951 707/726 |
| 8,166,029 | B2 | 4/2012 | Park et al. |
| 8,359,611 | B2 * | 1/2013 | Johnson ........... H04N 21/26603 725/32 |
| 8,387,083 | B1 * | 2/2013 | Prasad .................. H04N 21/84 386/292 |
| 9,948,989 | B1 | 4/2018 | Hannum et al. |
| 2003/0018659 | A1 | 1/2003 | Fuks et al. |
| 2003/0135490 | A1 | 7/2003 | Barrett et al. |
| 2003/0192050 | A1 | 10/2003 | Fellenstein et al. |
| 2004/0015397 | A1 | 1/2004 | Barry et al. |
| 2004/0088729 | A1 | 5/2004 | Petrovic |
| 2004/0187164 | A1 | 9/2004 | Kandasamy |
| 2007/0005653 | A1 | 1/2007 | Marsh |
| 2007/0244902 | A1 * | 10/2007 | Seide ...................... G06F 16/78 |
| 2007/0299874 | A1 * | 12/2007 | Neumann ............... G06F 16/40 |
| 2008/0126303 | A1 | 5/2008 | Park |
| 2012/0084818 | A1 | 4/2012 | Ali et al. |
| 2021/0120313 | A1 | 4/2021 | Rao et al. |
| 2021/0136457 | A1 | 5/2021 | Rao et al. |

OTHER PUBLICATIONS

Tol R et al.: "Requirements of metadata over bi-directional networks", 18. TV Anytime Meeting; Jul. 30, 2002-Aug. 2, 2002; Geneva; FTP://FTP.BBC.CO.UK, No. TV150, Aug. 5, 2002 (Aug. 5, 2002), XP030096157.

* cited by examiner

MEDIA CONTENT SEARCH RESULTS RANKED BY POPULARITY

RELATED APPLICATIONS

This application is a continuation of and claims priority to U.S. patent application Ser. No. 16/509,195, filed Jul. 11, 2019, pending, which is a continuation and claims priority to U.S. patent application Ser. No. 15/923,429, filed Mar. 16, 2018, pending, which is a continuation and claims priority to U.S. patent application Ser. No. 15/377,129, filed Dec. 13, 2016, now U.S. Pat. No. 9,948,991, which is a continuation of and claims priority to U.S. patent application Ser. No. 15/174,655, filed Jun. 6, 2016, now U.S. Pat. No. 9,554,193, which is a continuation of and claims priority to U.S. patent application Ser. No. 15/064,111, filed Mar. 8, 2016, abandoned, which is a continuation of and claims priority to U.S. patent application Ser. No. 13/915,411, filed Jun. 11, 2013, now U.S. Pat. No. 9,326,025, which is a continuation of and claims priority to U.S. patent application Ser. No. 12/846,442, filed Jul. 29, 2010, now U.S. Pat. No. 8,478,750, which is a continuation of and claims priority to U.S. patent application Ser. No. 11/716,236, filed Mar. 9, 2007, now U.S. Pat. No. 7,801,888, the disclosures of which are incorporated herein by reference in their entirety.

BACKGROUND

As the variety of television programming and media content sources continues to increase, viewers may want to locate television media content and programming choices that may be of interest to them. In addition to scheduled television program broadcasts, television viewing options also include on-demand choices which enable a viewer to search for and request media content for viewing when convenient rather than at a scheduled broadcast time.

A viewer can initiate a search for a list of television programming choices in a program guide (also commonly referred to as an electronic program guide or "EPG"). A search is typically based on text-string matching, and an alphabetical list of programs and/or movies is filtered and returned in response to the search request. Another type of search for television programming choices is a field-based search, such as a search for "new movies" or "sports" Text-string matching is a fairly limited form of searching, in that a viewer's results will be limited to a set of programs that happen to have the search string in a particular field, and therefore the search results are dependent on what the metadata creators add to the field descriptions. This leads to the viewer obtaining results that either do not have the desired program or bury the desired program in a long list of results because many programs have the same text-string. In addition, if a viewer misspells a search term, the search system can return unwanted results or even no results at all.

Unwanted, too many, or even no search results can lead to viewer dissatisfaction when wanting to locate television programming that may be of interest to the viewer. In addition, a search initiated via a program guide may be cumbersome for a viewer who enters the search term(s) with a remote control device. Further, a slowly delivered search response from a search system of a content provider can increase the frustration of repeated searching for the viewer.

SUMMARY

This summary is provided to introduce simplified concepts of media content search results ranked by popularity. The simplified concepts are further described below in the Detailed Description. This summary is not intended to identify essential features of the claimed subject matter, nor is it intended for use in determining the scope of the claimed subject matter.

In embodiments, a search request for television media content can be initiated by a viewer, and the television media content that is relevant to the search request can be identified. The relevant television media content can then be ranked based on a popularity rating and the relevant television media content can be displayed in an ordered list that is ordered by popularity rankings.

In other embodiments, a television client device can receive a search request for television media content, and a search module can identify the television media content that is relevant to the search request. A tracking module can track one or more searches for the television media content, information requests, programming choices, recordings, and/or new television media content to develop a popularity rating. The tracking module can then rank the relevant television media content based on the popularity rating to determine popular media content. A list of the popular media content can be displayed to include likely viewer choices. The tracking module can be implemented as a component of the television client device, as a component of a content provider that provides the television media content to the television client device, or as a component of both.

BRIEF DESCRIPTION OF THE DRAWINGS

Embodiments of media content search results ranked by popularity are described with reference to the following drawings. The same numbers are used throughout the drawings to reference like features and components.

DETAILED DESCRIPTION

One or more embodiments of media content search results ranked by popularity enables a viewer to enter search term(s) to initiate a search request for television media content, and to receive a list of media content whose identification and ordering is informed by a popularity measure, such as a popularity rating. The list of media content can be organized based on the popularity of the television media content as determined from tracked television media content. The television media content, such as programs, movies, music, on-demand media content, network-based applications, and the like, can be tracked to identify and rank the media content that a viewer or viewers would likely search and request for viewing. The popularity of the tracked media content can be estimated to provide a viewer with likely programming choices for viewing, rather than simply returning an alphabetical list of television viewing selections when a viewer initiates a search request.

While features and concepts of the described systems and methods for media content search results ranked by popularity can be implemented in any number of different environments, computing systems, entertainment systems, and/or other various configurations, embodiments of media content search results ranked by popularity are described in the context of the following example systems and environments.

Figure 1:
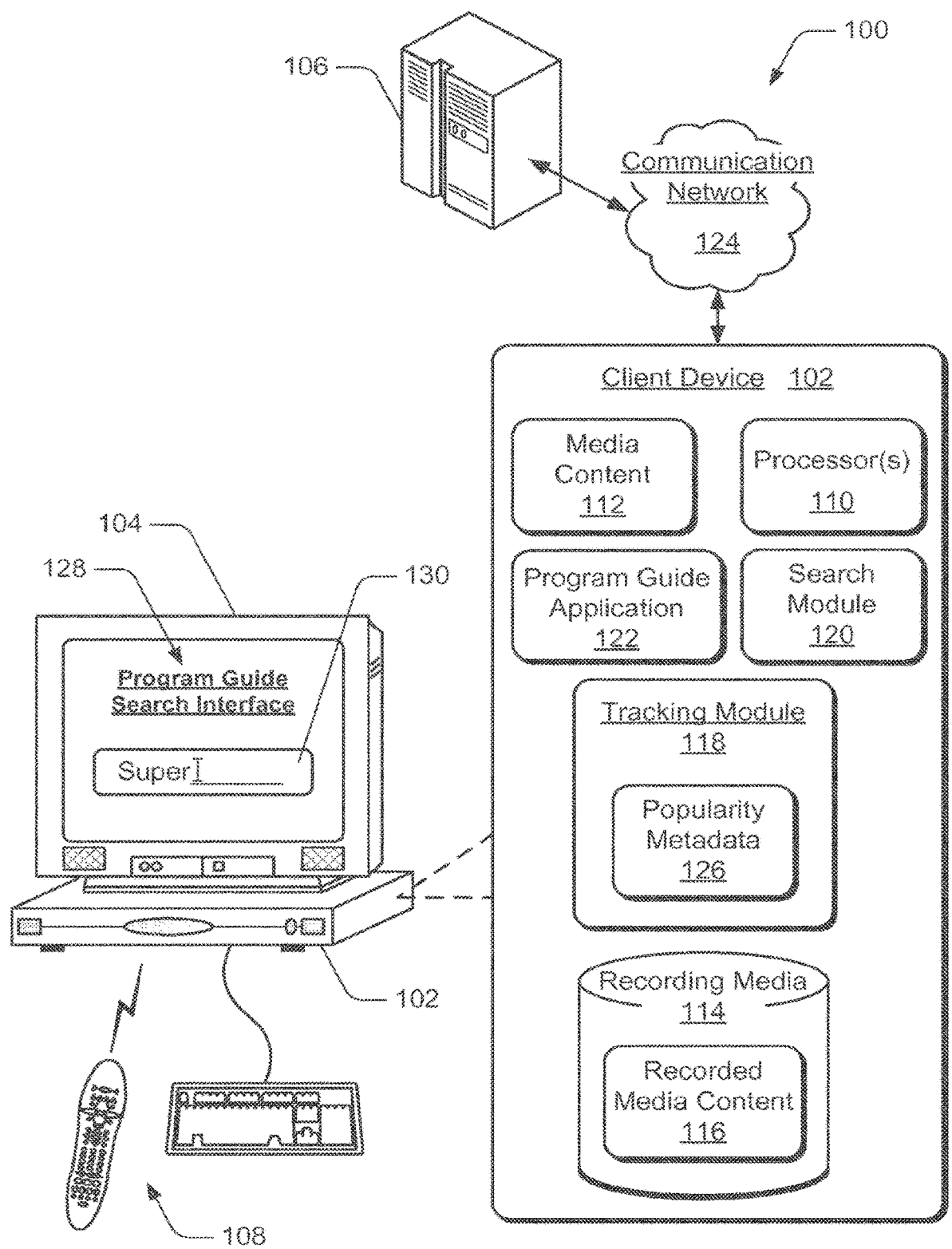
FIG. 1 illustrates an example system in which embodiments of media content search results ranked by popularity can be implemented.

FIG. 1 illustrates an example system 100 in which various embodiments of media content search results ranked by popularity can be implemented. In this example, system 100 includes a television client device 102, a display device 104, content provider(s) 106, and input devices 108, such as a remote control device and/or a computer keyboard. The display device 104 can be implemented as any type of television, LCD, or similar television-based display system that renders audio, video, and/or image data. The client device 102 and display device 104 together are just one example of a television client system, examples of which are described with reference to the example entertainment and information system shown in FIG. 7.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. In this example, client device 102 includes one or more processor(s) 110, media content 112 (e.g., received media content or media content that is being received), and recording media 114 that maintains recorded media content 116.

Client device 102 also includes a tracking module 118, a search module 120, and a program guide application 122, all of which can be implemented as computer-executable instructions and executed by the processor(s) 110 to implement embodiments of media content search results ranked by popularity. Additionally, client device 102 can be implemented with any number and combination of differing components as further described with reference to the example client device shown in FIG. 6.

Although the tracking module 118, search module 120, and program guide application 122 are each illustrated and described as single applications, each can be implemented as several component applications or modules distributed to perform one or more functions of media content search results ranked by popularity. Further, although the tracking module 118, search module 120, and program guide application 122 are illustrated and described as separate applications, the tracking module 118, search module 120, and/or program guide application 122 can be implemented together as a single application in the client device 102 to implement embodiments of media content search results ranked by popularity.

The media content 112 and/or the recorded media content 116 can include television programs (or programming), which may be any form of programs, commercials, music, movies, and video on-demand media content. Other media content can include interactive games, network-based applications, music streamed from a computing device to the client device 102, as well as any other audio, video, and/or image content received from any type of media content source.

The recording media 114 along with a playback application can be implemented as a DVR system to record and maintain the recoded media content 116. The television client device 102 can be configured for communication with the content provider(s) 106 via a communication network 124, which in this example can include an IP-based network as described with reference to the communication network(s) shown in FIGS. 2 and 6. Client device 102 receives the media content 112 and/or the recorded media content 116 from content server(s) of the content provider(s) 106 via the communication network 124. The communication network 124 can be implemented using any type of network topology and/or communication protocol, and can be represented or otherwise implemented as a combination of two or more networks.

In one or more embodiments, the tracking module 118 can be implemented to track various aspects of television programming and recordings at the client device 102. For example, the tracking module 118 can track television programming choices selected by a viewer who interacts with the client device 102; searches for television media content initiated by a viewer; the recorded media content 116; listings for new television media content; and/or any other type of requests for television media content initiated by a viewer at client device 102.

The tracking module 118 can include popularity metadata 126 from which a popularity rating for television media content can be determined or generated. The popularity of television media content can be determined according to a popularity factor, ranking, and/or index when tracking various aspects of television programming and recordings at client device 102. The popularity metadata 126 can include data and real-time tracking information corresponding to viewer programming choices (e.g., specific shows or a series of programs that a viewer selects to watch), search requests for media content, recordings, information requests, new television media content, and the like.

Further, the popularity metadata 126 can include the data and tracking information corresponding to one or multiple viewers. For example, many search requests from different viewers can be encompassed in the metadata associated with a particular program. The tracking module 118 can then determine the popularity of the particular program based on how often the media content is selected for viewing, recording, information requests, and/or any other type of viewer interaction. The tracking module 118 can also be implemented for collaborative filtering to identify a series of programs as popular media content for a viewer at the client device 102.

In addition to the traditional metadata associated with television media content, such as a title, the actors, a genre, and a description of the media content, the popularity metadata 126 can include the tracking data as well as additional information. For example, the popularity metadata 126 can include ratings from ratings providers, such as NIELSEN and/or ARBITRON data for a previous week, month, or other duration to approximate how many viewers watched a particular program.

The popularity metadata 126 can also include projected popularity rankings for new and/or upcoming television media content that will likely be requested often by many viewers. For example, the ranking of programming associated with the SUPER BOWL can be increased in advance of when the SUPER. BOWL is played. In addition, the popularity metadata 126 can include any other popularity metrics upon which to base a popularity factor, ranking, and/or index to determine popular media content.

In one or more embodiments, client device 102 includes the program guide application 122 that can be implemented to process program guide data from which a program guide can be rendered and/or displayed for viewing on display device 104. A program guide may also be commonly referred to as an electronic program guide or an "EPG". In this example, a program guide search interface 128 is displayed on display device 104 and includes a search input field 130 via which a viewer can input search term(s) to initiate a search request for television media content. A viewer can input the search term(s) to initiate the search request utilizing an input device 108, such as the remote control.

In an embodiment, the search module 120 can receive a search request for television media content when initiated by a viewer, and identify the television media content that is relevant to the search request. The tracking module 118 can then rank the relevant television media content based on a popularity rating and the relevant television media content can be displayed in an ordered list that is ordered by popularity rankings. The relevant television media content can include one or more likely viewer choices of popular media content displayed in the ordered list.

In an embodiment, the search results for television media content can include relevant media content based on a partial match to a search term of a viewer-initiated search request. For example, a viewer may enter only "Super" as shown on the display device 104 in the search input field 130. The search module 120 may identify many different media content choices having a partial match to the search term "Super". From the identified media content that is relevant to the search request, the tracking module 118 can determine that the viewer is likely requesting television media content associated with the SUPER BOWL if the search request is initiated at a time when the SUPER BOWL is an often requested and/or anticipated event. For example, the popularity metadata 126 associated with the SUPER BOWL will reflect many search, viewing, and/or recording requests from multiple viewers. The tracking module 118 can then rank the relevant television media content based on a popularity rating generated from the popularity metadata 126.

Once a viewer learns that a specific and/or complete text match is not necessary when initiating a search request to find television media content, the viewer can reduce the inputs needed via the search input field 130. Reducing the number of search inputs also makes searching easier for the viewer, particularly when utilizing the remote control input device 108 which can be cumbersome to enter the search characters.

In another embodiment, the search module 120 can be implemented to identify media content that is relevant to a search request from the popularity metadata 126 based on an incorrect search term of the search request. For example, a viewer may want to watch a particular movie, such as a movie entitled "Irretrievably Broken", but has forgotten the title of the movie. The viewer may inadvertently enter a search request of "Retrievable". If the entered text string "Retrievable" were compared in a text-based search to the "title" metadata fields for television media content, a match to the sought after movie will not be located. However, the search module 120 can compare the entered text string "Retrievable" to the popularity metadata 126. A popularity result of the movie "Irretrievably Broken" which most closely matches the viewer request will be turned when the popularity metadata 126 associated with the movie reflects multiple search, viewing, and/or recording requests. The likely viewer choice can then be displayed in a list of popular media content from which the viewer can select to receive the requested movie for viewing.

In another example, the popularity of media content can optionally be customized for a particular viewer in the popularity metadata 126. For example, a viewer may enter a search request for a particular word, such as "Star", in the search input field 130 on display device 104. The search module 120 may identify the programs "Star Gazers" and "Star Singers" as relevant media content to the search request. The tracking module 118 may then rank "Star Gazers" as the most likely relevant media content for the viewer because a history of this viewer's television programming choices in the popularity metadata 126 indicates that the viewer watches the program "Star Gazers", even though the program "Star Singers" may currently be a more popular program among multiple viewers.

In another example, one friend may call another to say, "watch the reality show that is on right now", and the called viewer can then enter a search request for "Reality" in the search input field 130. The search module 120 can receive the search request for "Reality" and compare the search term entry to the popularity metadata 126 and the "genre" metadata fields to locate the likely television reality program. The reality show can be identified by the tracking module 118 as the likely viewer choice because the program is currently being broadcast and has been selected for viewing by many other viewers.

In an embodiment, the tracking module 118 can also rank television media content that is identified as being relevant to a search request based on a projected popularity of new television media content. When new or upcoming television media content is scheduled to be available, the media content can be weighted to establish a popularity-basis for the new media content.

In a projected popularity ranking scenario, or optionally a manual ranking scenario, a network operator at a content provider 106 may assume that an upcoming event or program will be popular and often requested for viewing and/or recording. However, the upcoming event or program will not have any associated tracking and/or popularity metadata to indicate a popularity history of the program before the program is available for viewing. Projected rankings may therefore be accomplished by manual assignment of popularity values to the upcoming media assets to match the operator's prediction of the popularity of the media. Alternatively, popularity values can be derived from historical data (e.g. for an annual show, popularity ratings for the program historically), or popularity of the content in other media forms (e.g. for a new Pay-Per-View movie, the popularity ranking can be derived from the movie's success in the theatres).

The tracking module 118 can then rank the program having the weighted popularity as a likely selectable viewing option for a viewer. For example, if a new movie that has been popular in the theatres is about to be released for video on-demand viewing, a network operator can project the popularity of the movie by weighting it to influence the popularity of the media content.

After the relevant television media content is identified by the search module 120, the tracking module 118 can rank the relevant television media content based on a popularity rating to determine popular media content in one or more embodiments. A list of the popular media content, or just the higher-ranking popular media content, can then be displayed on the display device 104 in response to a viewer-initiated search request. An example of a list of popular media content is further described with reference to the example shown in FIG. 3. The media content can be ranked according to viewer(s) programming choices, viewer(s) recording choices, information requests that are initiated or spawned from initial search results, and/or by any other metric by which the media content can be ranked.

In alternate embodiments of media content search results ranked by popularity, a content provider 106 can be implemented to include a tracking module. A tracking module at a content provider can also update popularity metadata to track the various aspects of television programming and recording selections of multiple viewers at multiple television client devices. These embodiments are further described with reference to the example system shown in FIG. 2. Alternatively, both content provider(s) and television client devices can include an implementation of tracking modules to track the television programming and recording selections together, or optionally independently.

Figure 2:
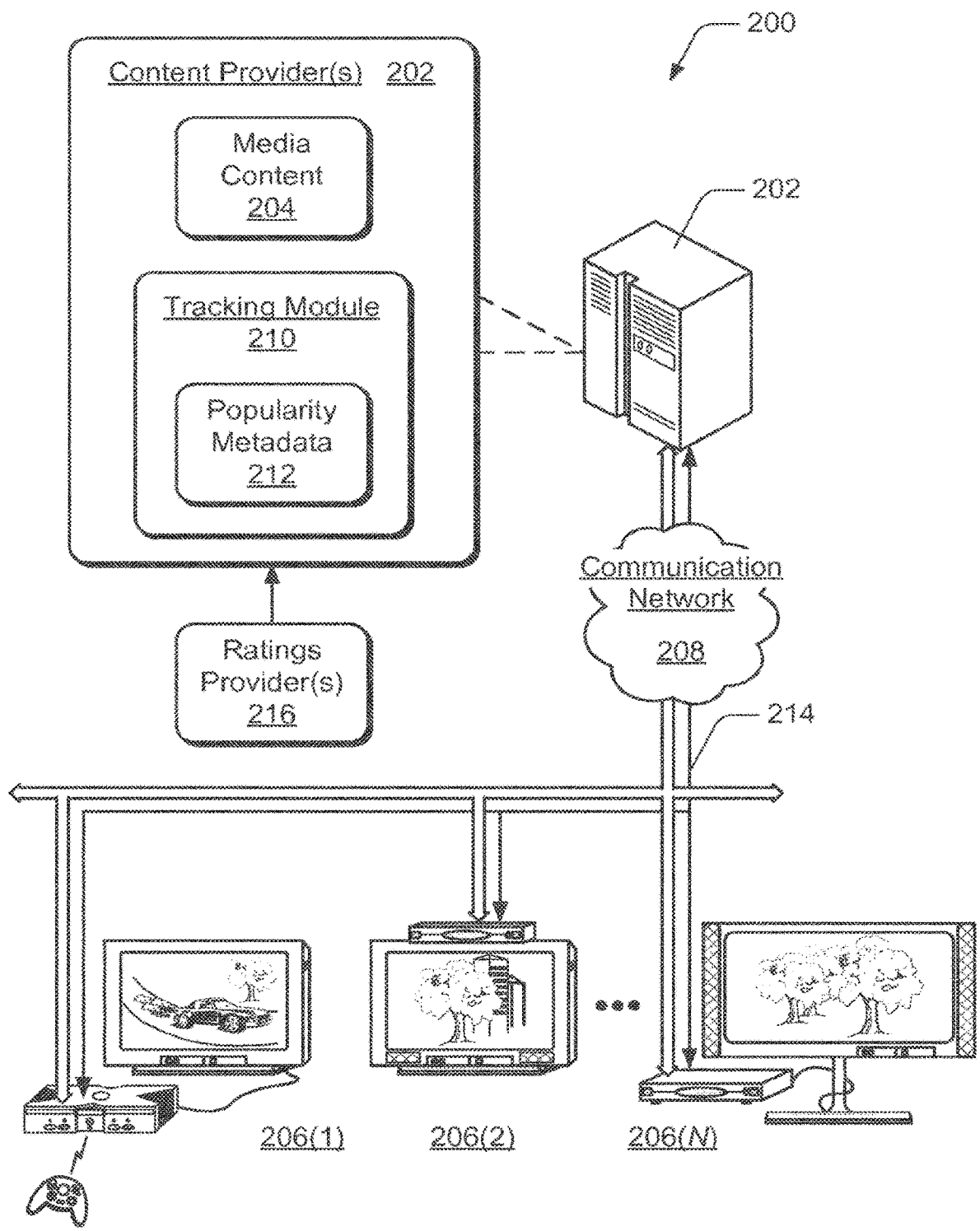
FIG. 2 illustrates another example system in which embodiments of media content search results ranked by popularity can be implemented.

FIG. 2 illustrates another example system 200 in which various embodiments of media content search results ranked by popularity can be implemented. The system 200 includes a content provider 202 that communicates media content 204 to any number "N" of various television client systems 206(1-N) via a communication network 208. An example of a communication network is described with reference to communication network 124, and examples of client devices in television client systems are described with reference to television client device 102 as shown in FIG. 1.

Each of the client systems 206(1-N) include a television client device and a respective display device, such as any type of television, monitor, LCD, or similar television-based display system that renders audio, video, and/or image data. Any of the client devices of the client systems 206(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. A television client device may also be associated with a user (i.e., a person) and/or an entity that operates a client device such that a television client device describes logical clients that include users, software, and/or devices.

Any of the television client devices of the respective client systems 206(1-N) can be implemented with one or more processors, a communication module, memory components, and a media content rendering system. Additionally, each of the television client devices can be configured for communication with any number of the different content providers to receive any type of media content from the content provider(s) via the communication network 208. Further, any of the television client devices can be implemented with any number and combination of differing components as further described with reference to the example client device shown in FIG. 6.

In this example, content provider 202 includes a tracking module 210 having popularity metadata 212. In one or more embodiments, tracking module 210 can be implemented to track various aspects of television programming and recordings at the client systems 206(1-N). For example, the tracking module 210 can track television programming choices selected by multiple viewers that interact with the client devices; searches for television media content initiated by the multiple viewers; television media content recorded by the multiple viewers; listings for new television media content; and/or any other type of requests for television media content initiated by the multiple viewers at the various client systems 206(1-N).

The tracking module 210 can include popularity metadata 212 from which the more popular media content can be determined. The popularity of television media content can be determined according to a popularity rating, factor, ranking, and/or index when tracking the various aspects of television programming and recordings at the client systems 206(1-N). The tracking module 210 can determine or develop a popularity rating for particular media content based on how often the media content is selected for viewing, recording, information requests, and/or any other type of viewer interaction.

Figure 7:
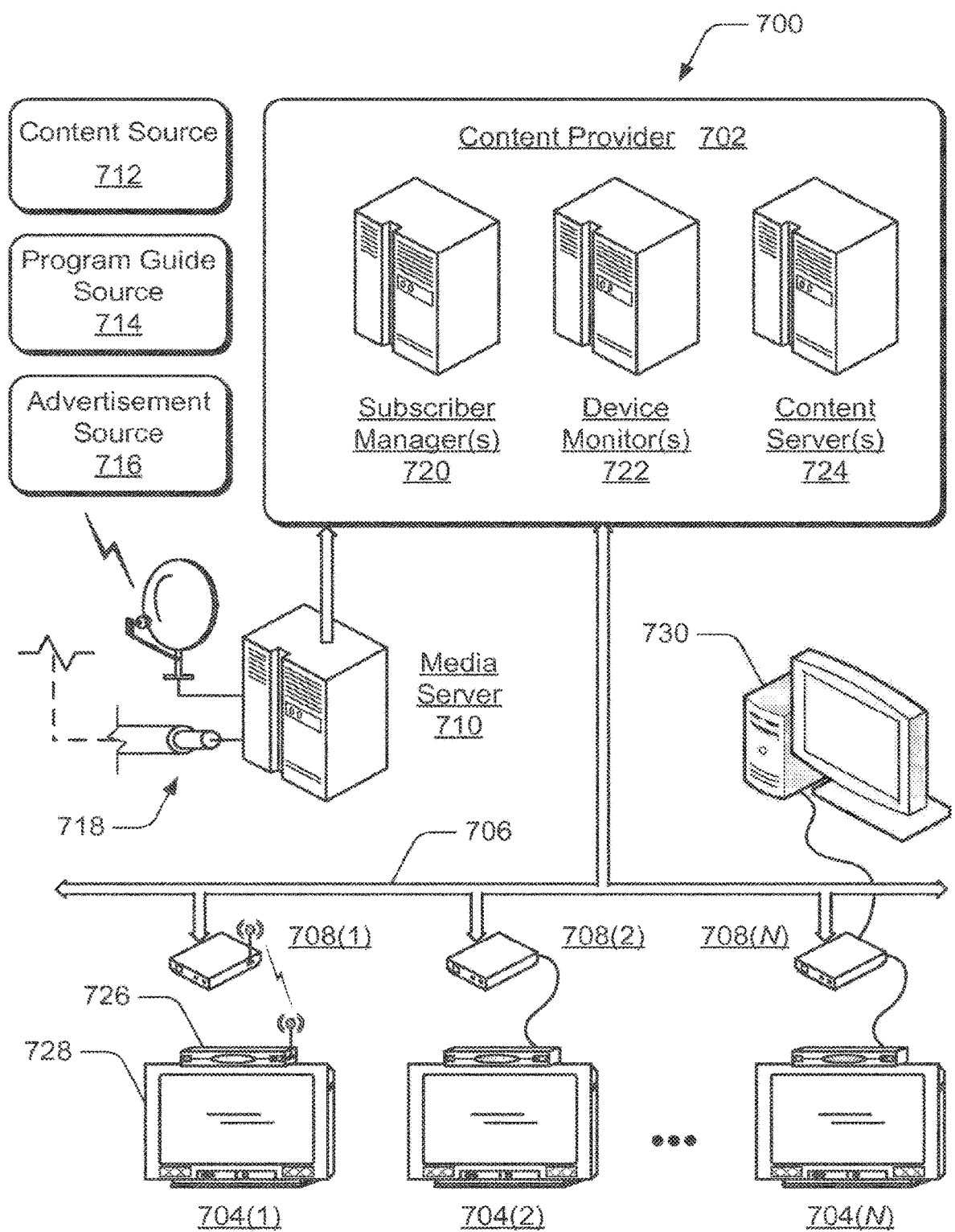
FIG. 7 illustrates various devices and components in an example entertainment and information system in which embodiments of media content search results ranked by popularity can be implemented.

The popularity metadata 212 can include data and the real-time tracking information corresponding to viewer programming choices, search requests for media content, recordings, information requests, new television media content, and the like. In an embodiment, the real-time tracking information can be obtained via the communication network 208 when implemented as a network that includes a back-channel or other two-way communication link 214 between the content provider 202 and the television client systems 206(1-N). In an IPTV system, such as shown in FIG. 7, an IP-based network provides two-way communication via which the tracking module 210 receives real-time tracking information for viewer-initiated media content interactions at the client systems 206(1-N).

Although data streams of media content are not shown specifically, the arrowed communication links 214 and the communication network 208 illustrate various data communication links that include data streams of media content. Additionally, it is contemplated that any one or more of the arrowed communication links 208, 214 can facilitate two-way data communication, such as from the content provider 202 to television client system 206(1) and vice-versa.

The popularity metadata 212 can also include additional information, such as ratings from ratings providers 216 to approximate how many viewers watched a particular program. The popularity metadata 212 can also include projected popularity rankings for new and/or upcoming television media content that will likely be requested often by many viewers.

The tracking module 210 can receive a search request for television media content via the communication network 208 when the search request is initiated by a viewer at a television client system 206(1-N). In one or more embodiments, the tracking module 210 can be implemented to rank television media content that is relevant to a search request based on the popularity rating as determined from the popularity metadata 212. A list of popular media content, or just the higher-ranking popular media content, can then be displayed at a client system 206(1-N) in response to a viewer-initiated search request.

Figure 3:
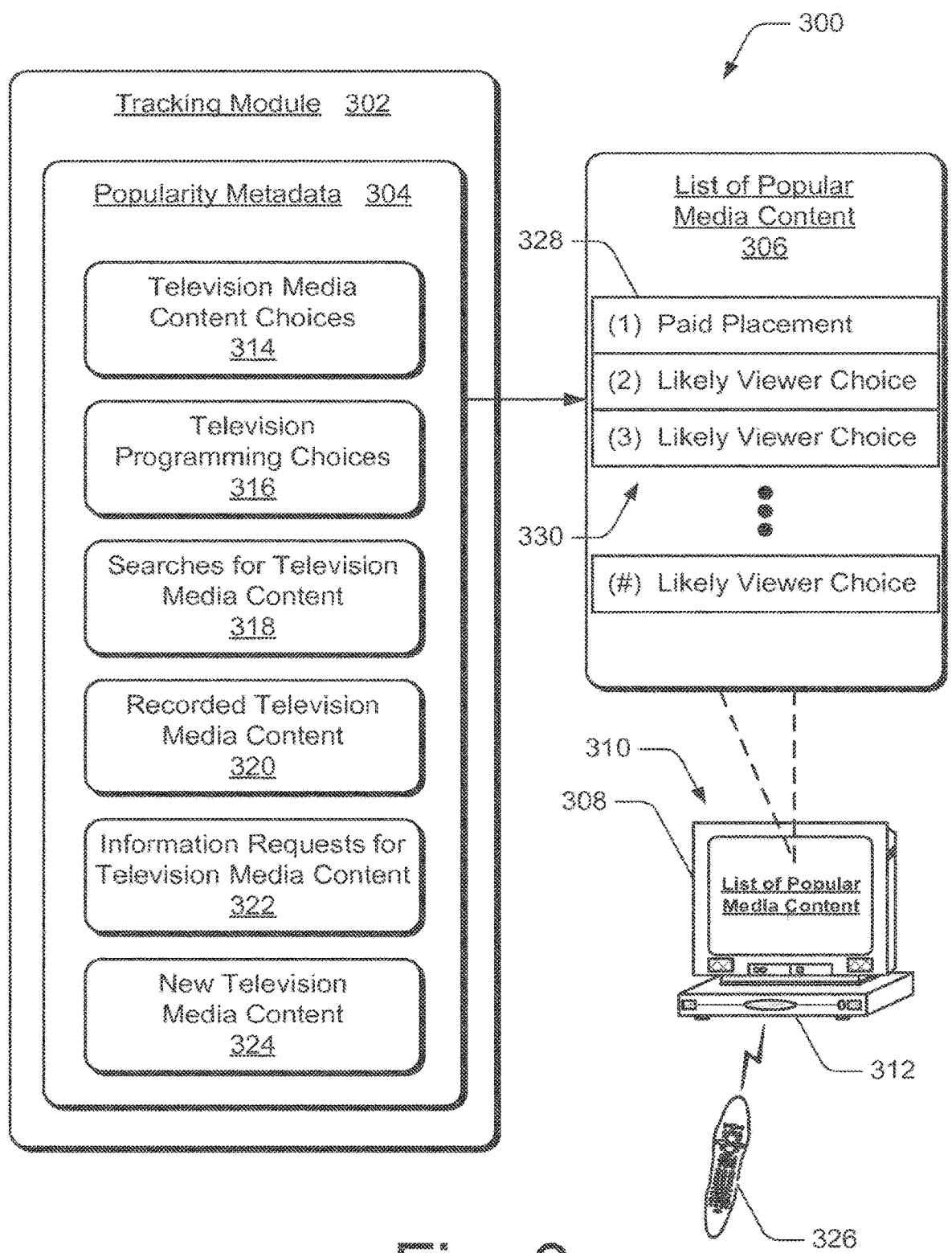
FIG. 3 illustrates an example tracking module having popularity metadata from which a list of popular media content can be generated in embodiments of media content search results ranked by popularity.

FIG. 3 illustrates an example 300 of a tracking module 302 having popularity metadata 304 from which a popularity rating can be determined. Television media content that is relevant to a search request can be ranked by the tracking module 302 based on the popularity rating. A list of popular media content 306 can be generated for display on a display device 308 of a television client system 310 (to include a television client device 312). Features and embodiments of the tracking module 302 are described with reference to tracking module 118 implemented at client device 102 as shown in FIG. 1, and/or with reference to tracking module 210 implemented at content provider 202 as shown in FIG. 2.

The popularity metadata 304 is one example of the popularity metadata included with the tracking modules and described with reference to FIGS. 1 and 2. In one or more embodiments, the tracking module 302 can be implemented to track various television media content programming, recording, and information selections by a viewer or a group of viewers. The tracking module 302 then maintains information pertaining to the tracked television programming choices, recordings, and information selections as the popularity metadata 304.

In this example, the popularity metadata 304 includes data and tracking information about television media content choices 314; television programming choices 316; searches for television media content 318; recorded television media content 320; information requests for television media content 322; and/or new television media content 324. The tracking module 302 can rank television media content that is relevant to a search request based on a popularity rating to determine popular media content. The list of popular media content 306 can then be generated to include all of the popular media content, or just the higher-ranking popular media content. The list of popular media content 306 can be displayed at the client system 310 in response to a viewer-initiated search request for media content. A viewer at client device 312 can then select a programming choice from the list 306 with a remote control input device 326.

In one or more embodiments, the list of popular media content 306 can be displayed to optionally include paid placement of particular media content at a position in the list that is more prominent than popular media content without paid placement. For example, a business method may allow a content provider to pay for the placement of a new video on-demand movie at a prominent position in the list for likely viewer selection. In an example, the list of popular media content 306 can be displayed to include paid placement of particular media content at a first position 328 in the list. Alternatively, the list of popular media content 306 can be displayed to include a likely viewer choice at the first position 328 in the list.

In this example, the list of popular media content 306 includes paid placement of media content at the first position 328 in the list, and then includes likely viewer choices at the subsequent positions 330 in the list. For example, a likely viewer choice based on the television programming choices 316 of the viewer (e.g., a user history popularity) can be displayed at a second position in the list. Further, at least an additional likely viewer choice based on the television programming choices of multiple viewers (e.g. a general history popularity) can be displayed at a third position in the list.

Figure 4:
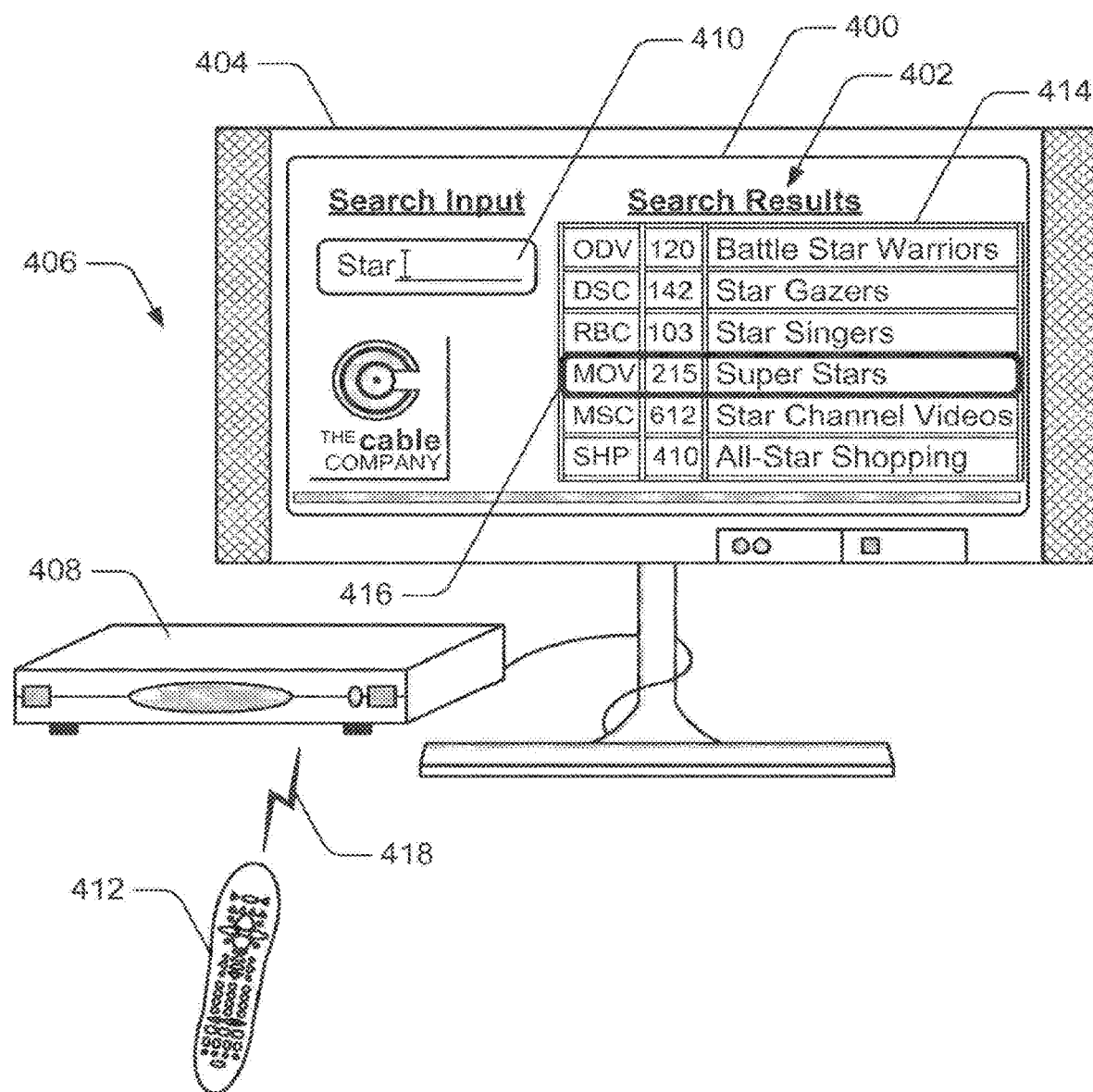
FIG. 4 illustrates an example user interface that displays an ordered list of search results for television media content that are ordered by popularity rankings in embodiments of media content search results ranked by popularity.

FIG. 4 illustrates an example of a user interface 400 that displays an ordered list 402 of search results for television media content that are ordered by popularity rankings. The ordered list 402 of search results is shown on a display device 404 of a television client system 406 that includes a television client device 408. The television media content shown ranked in the list 402 can be displayed in response to a viewer-initiated search request for television media content. For example, user interface 400 includes a search input field 410 via which a viewer can input search term(s) to initiate a search request for television media content. A viewer can input the search term(s) to initiate the search request utilizing an input device 412, such as a remote control.

In this example, a viewer may enter a search request for a particular word, such as "Star", in the search input field 410 on display device 404. A search module of client device 408 may then identify any number of various programs, movies, and/or other media content corresponding to the search term "Star". A tracking module of client device 408 can then rank the various programs, movies, and/or other media content (i.e. the relevant television media content) based on a popularity rating. The ordered list 402 of relevant television media content can then be displayed from which a viewer can select one of the media content for viewing with the emote control input device 412.

The ordered list 402 of search results for the television media content is shown on display device 404 in a viewer-navigable grid 414 of a program guide that enables a viewer to navigate the grid and select media content for viewing. In addition to the list of television media content, the ordered list 402 can include any type of associated numeric and/or channel designators as additional information about particular television media content.

The viewer-navigable grid 414 can include a selectable control 416 shown implemented as an on-screen focus that can be positioned to identify particular television media content and, when selected, initiate receiving the program, movie, or other media content for viewing. A viewer can move the selectable control 416 within the grid 414 and select the various listed media content by manipulating the remote control input device 412 via which the viewer can input control commands 418.

In one or more embodiments, the ordered list 402 can be displayed to optionally include paid placement of particular media content at a position in the list that is more prominent than media content without paid placement. For example, the new video on-demand movie "Battle Star Warriors" is positioned at a prominent position (e.g., at the top of the list) for likely viewer selection. Alternatively, the ordered list 402 of ranked television media content can be displayed to include a likely viewer choice at the first position in the list.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example method 500 described with reference to FIG. 5 may be described in the general context of computer-executable instructions. Generally, computer-executable instructions can include applications, routines, programs, objects, components, data structures, procedures, modules, functions, and the like that perform particular functions or implement particular abstract data types. The method may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent and the techniques may be implemented on a variety of computing platforms having a variety of processors.

Figure 5:
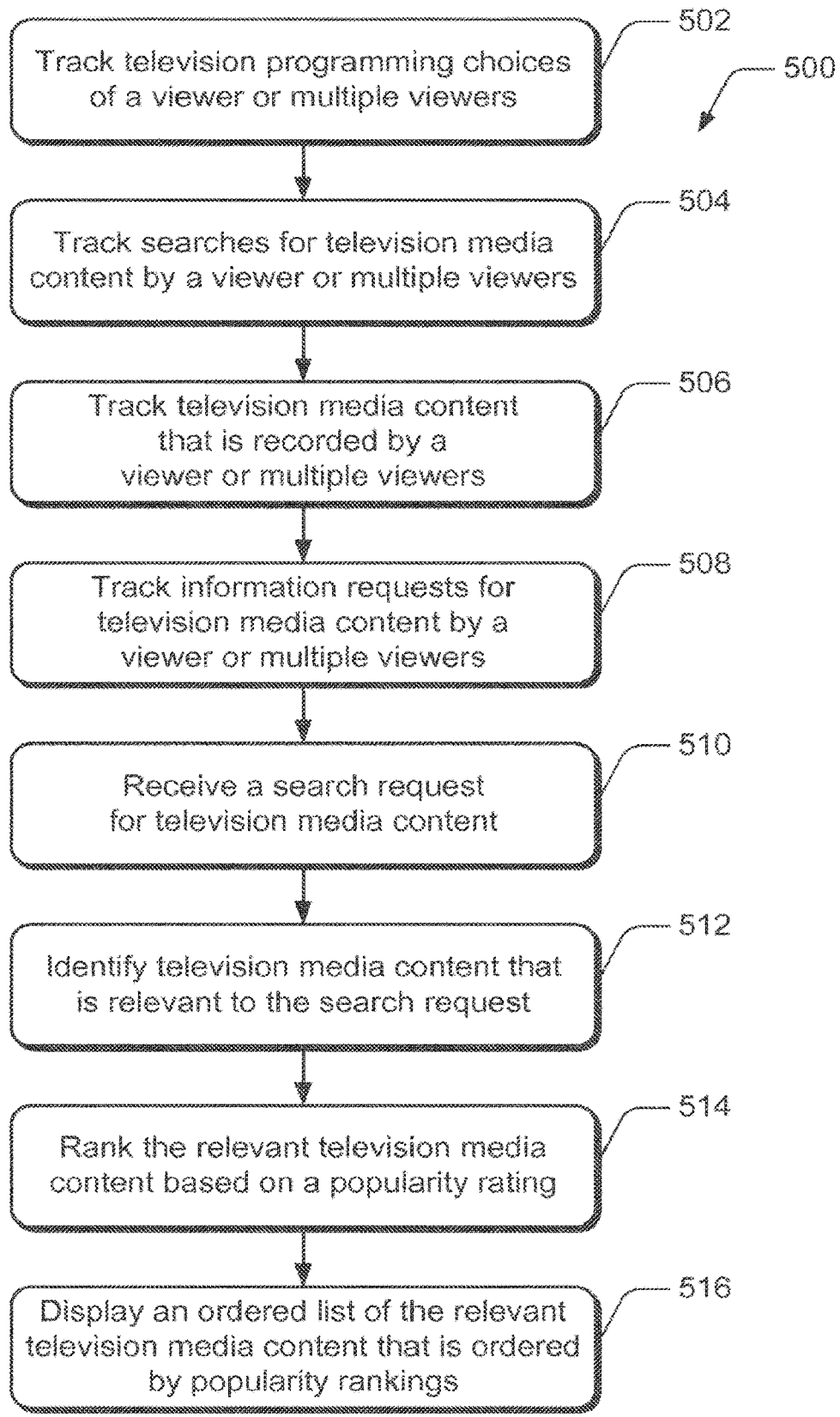
FIG. 5 illustrates example method(s) for media content search results ranked by popularity in accordance with one or more embodiments.

FIG. 5 illustrates example method(s) 500 of media content search results ranked by popularity. The order in which the method is described is not intended to be construed as a limitation, and any number of the described method blocks can be combined in any order to implement the method, or an alternate method.

At block 502, television programming choices of a viewer or multiple viewers are tracked. For example, tracking module 118 (FIG. 1) tracks the television programming choices of a viewer or multiple viewers at television client device 102. The tracking module 118 maintains the tracking information as popularity metadata 126. Alternatively, or in addition, tracking module 210 (FIG. 2) at content provider 202 tracks television programming choices of multiple viewers at television client systems 206(1-N). The tracking module 210 maintains the tracking information as popularity metadata 212. Further, tracking module 302 (FIG. 3) can track the television programming choices 316 of one or more viewers at various television client devices. In an embodiment, real-time tracking information can be received from multiple viewers via a two-way communication network, such as an IP-based communication network that facilitates a two-way communication link between content provider(s) and television client systems in an IPTV system.

At block 504, searches for television media content by a viewer or multiple viewers are tracked. For example, tracking module 118 tracks searches for television media content by a viewer or multiple viewers at client device 102. Similarly, tracking module 210 tracks searches for television media content by multiple viewers at client systems 206(1-N), and/or tracking module 302 tracks searches for television media content 318.

At block 506, television media content that is recorded by a viewer or multiple viewers are tracked. For example, tracking module 118 tracks television media content that is recorded by a viewer or multiple viewers at client device 102. Similarly, tracking module 210 tracks television media content that is recorded by multiple viewers at client systems 206(1-N), and/or tracking module 302 tracks recorded television media content 320.

At block 508, information requests for television media content by a viewer or multiple viewers are tracked. For example, tracking module 118 tracks information requests for or about television media content by a viewer or multiple viewers at client device 102. Similarly, tracking module 210 tracks information requests for television media content by multiple viewers at client systems 206(1-N), and/or tracking module 302 tracks information requests for television media content 322.

At block 510, a search request for television media content is received. For example, search module 120 receives a search request for television media content initiated by a viewer at client device 102. Similarly, tracking module 210 can receive search requests for television media content that are initiated by multiple viewers at client systems 206(1-N) (via communication network 208).

At block 512, television media content that is relevant to the search request is identified. For example, search module 120 identifies television media content that is relevant to a search request initiated by a viewer at client device 102. The search results for television media content can include relevant media content based on a partial match to a search term of a viewer-initiated search request. Additionally, the search module 120 can identify media content that is relevant to a search request from the popularity metadata 126 based on an incorrect search term of the search request.

At block 514, the relevant television media content is ranked based on a popularity rating. For example, tracking module 118 ranks the relevant television media content at client device 102 based on a popularity rating to determine popular media content. The popularity rating is determined from the popularity metadata 126 according to viewer programming choices, viewer recording choices, information requests that are initiated or spawned from initial search results, and/or by any other metric by which the relevant television media content can be ranked. Similarly, tracking module 210 ranks the relevant television media content for a viewer or multiple viewers at any of the client systems 206(1-N).

At block 516, a list of the relevant television media content is displayed in an ordered list that is ordered by popularity rankings. For example, the ordered list 402 of search results for television media content can be displayed from which a viewer can select one of the media content for viewing. The ordered list 402 is displayed to include the relevant television media content that is ordered by popularity rankings.

In another example, the list of popular media content 306 can be generated for display on display device 308 of the television client system 310 and a viewer can select a programming choice with the remote control input device 326. The list of popular media content 306 can be displayed to include all of the popular media content, or just the higher-ranking popular media content. The list of popular media content 306 can also be displayed to include paid placement of particular media content at a first position 328 in the list; a likely viewer choice based on television programming choices of the viewer at a second position in the list; and at least an additional likely viewer choice based on television programming choices of multiple viewers at a third position in the list.

Figure 6:
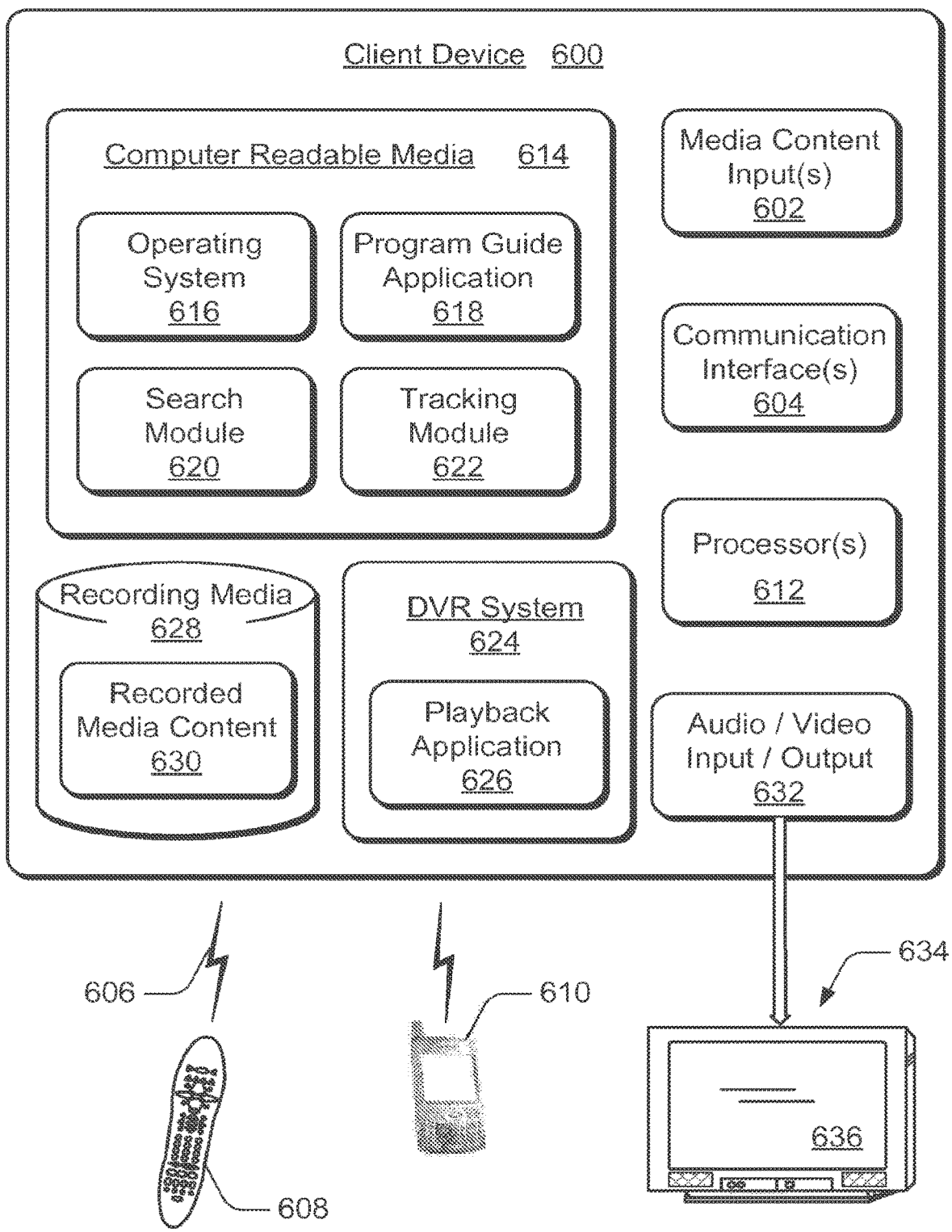
FIG. 6 illustrates various components of an example client device which can implement embodiments of media content search results ranked by popularity.

FIG. 6 illustrates various components of an example client device 600 that can be implemented as any form of a computing, electronic, or television client device to implement embodiments of media content search results ranked by popularity. For example, client device 600 can be implemented as client device 102 shown in FIG. 1, and/or as any of the client devices of the client systems 206(1-N) shown in FIG. 2. In various embodiments, client device 600 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 600 includes one or more media content inputs 602 that may include Internet Protocol (IP) inputs over which streams of media content are received via an IP-based network. Device 600 further includes communication interface(s) 604 that can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between client device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Client device 600 also includes one or more processors 612 (e.g., any of microprocessors, controllers, and the like)

which process various computer-executable instructions to control the operation of device 600, to communicate with other electronic and computing devices, and to implement embodiments of media content search results ranked by popularity. Client device 600 can be implemented with computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 614 provides data storage mechanisms to store various information and/or data such as software applications and any other types of information and data related to operational aspects of client device 600. For example, an operating system 616 and/or other application programs can be maintained as software applications with the computer-readable media 614 and executed on processor(s) 612 to implement embodiments of media content search results ranked by popularity.

Client device 600 can be implemented to include a program guide application 618 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer. In an embodiment, client device 600 can also be implemented to include a search module 620 and a tracking module 622 to implement embodiments of media content search results ranked by popularity. An example of search module 620 is described with reference to search module 120 shown in FIG. 1. Examples of tracking module 622 are described with reference to tracking module 118 shown in FIG. 1, tracking module 210 shown in FIG. 2, and with reference to tracking module 302 shown in FIG. 3.

Client device 600 can also include a DVR system 624 with playback application 626, and recording media 628 to maintain recorded media content 630 that client device 600 receives and/or records. Further, client device 60 may access or receive additional recorded media content that is maintained with a remote data store (not shown), such as from a video-on-demand server, or media content that is maintained at a broadcast center or content provider that distributes the media content to subscriber sites and client devices. The playback application 626 is a video control application that can be implemented to control the playback of media content, the recorded media content 630, and/or other video on-demand media content, music, and any other audio, video, and/or image media content which can be rendered and/or displayed for viewing.

Client device 600 also includes an audio and/or video output 632 that provides audio and/or video data to an audio rendering and/or display system 634. The audio rendering and/or display system 634 can include any devices that process display, and/or otherwise render audio, video, and image data. Video signals and audio signals can be communicated from device 600 to a display device 636 via an RF (radio frequency) link, S-video link, composite video link, component video link, DVI (digital video interface), analog audio connection, or other similar communication link. Alternatively, the audio rendering and/or display system 634 can be implemented as integrated components of the example client device 600. Client device 600 along with the audio rendering and/or display system 634 is an example of a viewing system that can be implemented in a household viewing area for viewing television programs and/or receiving other television media content.

FIG. 7 illustrates an example entertainment and information system 700 in which an IP-based television environment can be implemented, and in which embodiments of media content search results ranked by popularity can be implemented. System 700 facilitates the distribution of media content, program guide data, and advertising content to multiple viewers and to multiple viewing systems. System 700 includes a content provider 702 and any number "N" of client systems 704(1-N) each configured for communication via a communication network 706. Each client system 704(1-N) is an example of the client systems 206(1-N) described with reference to FIG. 2. Each of the client systems 704(1-N) can receive one or more data streams of media content, program content, program guide data, advertising content, closed captions data, and the like from content server(s) of the content provider 702 via the communication network 706.

The communication network 706 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content provider 702 and the client systems 704(1-N).

System 700 includes a media server 710 that receives media content from a content source 712, program guide data from a program guide source 714, and advertising content from an advertisement source 716. In an embodiment, the media server 710 represents an acquisition server that receives the audio and video media content from content source 712, an EPG server that receives the program guide data from program guide source 714, and/or an advertising management server that receives the advertising content from the advertisement source 716.

The content source 712, the program guide source 714, and the advertisement source 716 control distribution of the media content, the program guide data, and the advertising content to the media server 710 and/or to other servers. The media content, program guide data, and advertising content can be distributed via various transmission media 718, such as satellite transmission, radio frequency transmission, cable transmission, and/or via any number of other wired or wireless transmission media. In this example, media server 710 is shown as an independent component of system 700 that communicates the program content, program guide data, and advertising content to content provider 702. In an alternate implementation, media server 710 can be implemented as a component of content provider 702.

Content provider 702 is representative of a headend service in a content distribution system, for example, that provides the media content, program guide data, and advertising content to multiple subscribers (e.g., the client systems 704(1-N)). The content provider 702 can be implemented as a satellite operator, a network television operator, a cable operator, and the like to control distribution of media content, program and advertising content, such as movies, television programs, commercials, music, and other audio, video, and/or image content to the client systems 704(1-N).

Content provider 702 includes various components to facilitate media data processing and content distribution, such as a subscriber manager 720, a device monitor 722, and one or more content servers 724. The subscriber manager 720 manages subscriber data, and the device monitor 722 monitors the client systems 704(1-N) (e.g., and the subscribers), and maintains monitored client state information.

Although the various managers, servers, and monitors of content provider 702 (to include the media server 710 in one embodiment) are illustrated and described as distributed, independent components of content provider 702, any one or more of the managers, servers, and monitors can be implemented together as a multi-functional component of content provider 702. Additionally, any one or more of the managers, servers, and monitors described with reference to system 700 can implement features and embodiments of media content search results ranked by popularity.

The client systems 704(1-N) can each be implemented to include a client device 726 and a display device 728 (e.g., a television, LCD, and the like). A client device 726 of a client system 704 can be implemented in any number of embodiments, such as a set-top box, a digital video recorder (DVR) and playback system, an appliance device, a gaming system, and as any other type of client device that may be implemented in an entertainment and information system. In an alternate embodiment, client system 704(N) is implemented with a computing device 730 as well as a client device. Additionally, any of the client devices 726 of a client system 704 can implement features and embodiments of media content search results ranked by popularity as described herein.

Although embodiments of media content search results ranked by popularity have been described in language specific to features and/or methods, it is to be understood that the subject of the appended claims is not necessarily limited to the specific features or methods described. Rather, the specific features and methods are disclosed as example implementations of media content search results ranked by popularity.

The invention claimed is:

1. A method for customizing search results for a user, the method comprising:
receiving a first search request, the first search request comprising a keyword;
retrieving a first plurality of media asset search results corresponding to the first search request;
receiving a selection of a selected media asset from the first plurality of search results;
storing an indication of the selection of the selected media asset; and
in response to receiving a second search request, the second search request comprising the keyword:
retrieving a second plurality of media asset search results corresponding to the second search request, the second plurality of media asset search results comprising the selected media asset and a second media asset; and
generating for display a ranked list of media assets, wherein the selected media asset is placed at a higher position than the second media asset based on an identification of a stored indication of the selection of the selected media asset.

2. The method of claim 1, wherein identification of a stored indication of the selection of the selected media asset comprises:
identifying from a plurality of stored indications a stored indication of the selection of the selected media asset.

3. The method of claim 2, wherein the indication of the selection of the selected media asset is stored in user interaction metadata associating the indication of the selection of the selected media asset with the first search request, the method further comprising:
accessing the user interaction metadata; and
retrieving a plurality of stored indications of selections of media assets associated with search requests comprising the keyword.

4. The method of claim 1, further comprising:
detecting selection of a second media asset search result of the second plurality of media asset search results from the ranked list of media assets; and
storing an indication of the selection of the second search result in association with the keyword.

5. The method of claim 1, wherein the second plurality of media asset search results further comprises a third media asset search result, the method further comprising:
determining whether the third media asset search result was selected in response to more than one previous search request comprising the keyword; and
in response to determining that a third media asset search result was selected in response to more than one previous search result, placing the third media asset at a higher position in the ranked list than the selected media asset.

6. The method of claim 5, wherein determining that the selected media asset search result was selected in response to a previous search request comprising the keyword further comprises:
extracting, from descriptive metadata of the selected media asset search result, an identifier of the selected media asset search result; and
searching user interaction metadata to identify an indication of selection of a media asset search result having the extracted identifier.

7. The method of claim 6, wherein searching the user interaction metadata to identify a media asset search result having the extracted identifier comprises:
extracting, from descriptive metadata, an indication of an identifier of a series of media assets associated with the selected media asset search result; and
identifying at least a partial match between the identifier of the series of media assets and the identifier of the series of media assets indicated by the user interaction metadata associated with the selected media asset search result.

8. The method of claim 1, wherein retrieving the first plurality of media asset search results comprises:
determining, for each of a first plurality of media assets, whether descriptive metadata associated with each respective media asset contains the keyword; and
based on determining that the descriptive metadata associated with a respective media asset contains the keyword, adding the respective media asset to the first plurality of media asset search results.

9. The method of claim 1, wherein retrieving the second plurality of media asset search results comprises:
determining, for each of a second plurality of media assets, whether descriptive metadata associated with each respective media asset contains the keyword; and based on determining that the descriptive metadata associated with a respective media asset contains the keyword, adding the respective media asset to the second plurality of media asset search results.

10. The method of claim 1, wherein the selection of the selected media asset search result comprises at least one of: a user selection for viewing the media asset, a user selection for recording the media asset, or a user request for further information about the media asset.

11. A system for customizing search results for a user, the system comprising:
   memory; and
   control circuitry configured to:
      receive a first search request, the first search request comprising a keyword;
      retrieve a first plurality of media asset search results corresponding to the first search request;
      receive a selection of a selected media asset from the first plurality of search results;
      store, in the memory, an indication of the selection of the selected media asset; and
      in response to receiving a second search request, the second search request comprising the keyword:
         retrieve a second plurality of media asset search results corresponding to the second search request, the second plurality of media asset search results comprising the selected media asset and a second media asset; and
         generate for display a ranked list of media assets, wherein the selected media asset is placed at a higher position than the second media asset based on an identification of a stored indication of the selection of the selected media asset.

12. The system of claim 11, wherein the control circuitry is further configured to perform identification of a stored indication of the selection of the selected media asset by:
   identifying from a plurality of stored indications a stored indication of the selection of the selected media asset.

13. The system of claim 12, wherein the indication of the selection of the selected media asset is stored in user interaction metadata associating the indication of the selection of the selected media asset with the first search request, and wherein the control circuitry is further configured to:
   access the user interaction metadata; and
   retrieve a plurality of stored indications of selections of media assets associated with search requests comprising the keyword.

14. The system of claim 11, wherein the control circuitry is further configured to:
   detect selection of a second media asset search result of the second plurality of media asset search results from the ranked list of media assets; and
   store an indication of the selection of the second search result in association with the keyword.

15. The system of claim 11, wherein the second plurality of media asset search results further comprises a third media asset search result, and wherein the control circuitry is further configured to:
   determine whether the third media asset search result was selected in response to more than one previous search request comprising the keyword; and
   in response to determining that a third media asset search result was selected in response to more than one previous search result, place the third media asset at a higher position in the ranked list than the selected media asset.

16. The system of claim 15, wherein the control circuitry configured to determine that the selected media asset search result was selected in response to a previous search request comprising the keyword is further configured to:
   extract, from descriptive metadata of the selected media asset search result, an identifier of the selected media asset search result; and
   search user interaction metadata to identify an indication of selection of a media asset search result having the extracted identifier.

17. The system of claim 16, wherein the control circuitry configured to search the user interaction metadata to identify a media asset search result having the extracted identifier is further configured to:
   extract, from descriptive metadata, an indication of an identifier of a series of media assets associated with the selected media asset search result; and
   identify at least a partial match between the identifier of the series of media assets and the identifier of the series of media assets indicated by the user interaction metadata associated with the selected media asset search result.

18. The system of claim 11, wherein the control circuitry configured to retrieve the first plurality of media asset search results is configured to:
   determine, for each of a first plurality of media assets, whether descriptive metadata associated with each respective media asset contains the keyword; and
   based on determining that the descriptive metadata associated with a respective media asset contains the keyword, add the respective media asset to the first plurality of media asset search results.

19. The system of claim 11, wherein the control circuitry configured to retrieve the second plurality of media asset search results is further configured to:
   determine, for each of a second plurality of media assets, whether descriptive metadata associated with each respective media asset contains the keyword; and
   based on determining that the descriptive metadata associated with a respective media asset contains the keyword, add the respective media asset to the second plurality of media asset search results.

20. The system of claim 11, wherein the selection of the selected media asset search result comprises at least one of: a user selection for viewing the media asset, a user selection for recording the media asset, or a user request for further information about the media asset.

* * * * *